(12) United States Patent  
Caprioli et al.

(10) Patent No.: US 7,934,080 B2
(45) Date of Patent: Apr. 26, 2011

(54) AGGRESSIVE STORE MERGING IN A PROCESSOR THAT SUPPORTS CHECKPOINTING

(75) Inventors: Paul Caprioli, Santa Clara, CA (US); Martin Karlsson, San Francisco, CA (US); Gideon N. Levinsky, Austin, TX (US); Khondakar A. Mujtaba, Milpitas, CA (US); Shailender Chaudhry, San Francisco, CA (US); Murali K. Inaganti, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 378 days.

(21) Appl. No.: 12/128,332

(22) Filed: May 28, 2008

(65) Prior Publication Data

US 2009/0300338 A1    Dec. 3, 2009

(51) Int. Cl.
*G06F 9/312* (2006.01)
(52) U.S. Cl. .................................................. 712/220
(58) Field of Classification Search ..................... None
See application file for complete search history.

(56) References Cited

U.S. PATENT DOCUMENTS

| | | | | |
|---|---|---|---|---|
| 5,860,107 A * | 1/1999 | Patel | | 711/140 |
| 6,145,054 A * | 11/2000 | Mehrotra et al. | | 711/119 |
| 6,151,658 A * | 11/2000 | Magro | | 711/110 |
| 6,351,790 B1 * | 2/2002 | Jones | | 711/141 |
| 6,463,511 B2 * | 10/2002 | Boatright et al. | | 711/145 |
| 6,523,109 B1 * | 2/2003 | Meier | | 712/225 |
| 6,704,846 B1 * | 3/2004 | Wu et al. | | 711/150 |
| 7,398,361 B2 * | 7/2008 | Gunna et al. | | 711/146 |
| 7,757,044 B2 * | 7/2010 | Cypher et al. | | 711/118 |
| 2002/0095403 A1 * | 7/2002 | Chandrasekaran et al. | | 707/1 |
| 2005/0251664 A1 * | 11/2005 | Caprioli et al. | | 712/228 |

\* cited by examiner

*Primary Examiner* — Eric Coleman
(74) *Attorney, Agent, or Firm* — Park, Vaughan, Fleming & Dowler, LLP

(57) ABSTRACT

Embodiments of the present invention provide a processor that merges stores in an N-entry first-in-first-out (FIFO) store queue. In these embodiments, the processor starts by executing instructions before a checkpoint is generated. When executing instructions before the checkpoint is generated, the processor is configured to perform limited or no merging of stores into existing entries in the store queue. Then, upon detecting a predetermined condition, the processor is configured to generate a checkpoint. After generating the checkpoint, the processor is configured to continue to execute instructions. When executing instructions after the checkpoint is generated, the processor is configured to freely merge subsequent stores into post-checkpoint entries in the store queue.

21 Claims, 4 Drawing Sheets

AGGRESSIVE STORE MERGING IN A PROCESSOR THAT SUPPORTS CHECKPOINTING

BACKGROUND

1. Field of the Invention

Embodiments of the present invention generally relate to the design of a processor in a computer system. More specifically, embodiments of the present invention facilitate merging stores in a store queue in a processor that supports checkpointing.

2. Related Art

Most modern processors include store queues to prevent the processor from experiencing delays associated with committing stores to the next level of the memory hierarchy. Generally, when a store is executed by a processor the store is buffered in a store queue, making it appear that the store has been completed. However, the store may be held in the store queue until other accesses to the next level of the memory hierarchy have finished.

Because a store can be held in the store queue for an extended period of time, processors typically forward data from buffered stores to subsequent dependent loads so that the loads can proceed without waiting for the buffered stores to complete. In order to determine if data should be forwarded to a subsequent load, processors compare the addresses of subsequent loads to the address for each entry in the store queue. This process typically involves using a content addressable memory (CAM) circuit to perform the comparison. Unfortunately, CAM circuits require considerable semiconductor area, consume significant power, and complicate the processor's design. Moreover, because the size of the CAM circuit scales with the number of entries in the store queue, the designers have been forced to limit the number of entries in the store queue.

Hence, what is needed is a store queue without the above-described problems.

SUMMARY

Embodiments of the present invention provide a processor that merges stores in an N-entry first-in-first-out (FIFO) store queue. In these embodiments, the processor starts by executing instructions before a checkpoint is generated. When executing instructions before the checkpoint is generated, the processor is configured to perform limited or no merging of stores into existing entries in the store queue. Then, upon detecting a predetermined condition, the processor is configured to generate a checkpoint. After generating the checkpoint, the processor is configured to continue to execute instructions. When executing instructions after the checkpoint is generated, the processor is configured to freely merge subsequent stores into post-checkpoint entries in the store queue.

In some embodiments, when generating the checkpoint, the processor is configured to set a commit pointer and a merge pointer to indicate an entry in the store queue that contains a youngest store. The processor is configured to then commit stores in entries equal to or older than the entry indicated by the commit pointer to an architectural state of the processor. However, the processor is configured to hold subsequent post-checkpoint stores buffered to entries younger than the entry indicated by the commit pointer in the store queue and prevent these entries from committing until the checkpoint is cleared. The processor is additionally configured to freely merge subsequent post-checkpoint stores into entries younger than the entry indicated by the merge pointer.

In some embodiments, while executing instructions after the checkpoint is generated, upon detecting that all post-checkpoint stores can be committed to the architectural state of the processor, the processor is configured to: (1) clear the checkpoint; (2) clear the commit pointer and the merge pointer; (3) release the post-checkpoint stores in the store queue to be committed to the architectural state of the processor; and (4) continue executing instructions. When continuing executing instructions after the checkpoint is cleared, the processor is configured to perform limited or no merging of stores into existing entries in the store queue.

In some embodiments, while executing instructions after the checkpoint is generated, upon detecting that an error that invalidates any of the post-checkpoint stores has occurred, the processor is configured to: (1) halt executing instructions; (2) use the checkpoint to restore an associated state; (3) invalidate the post-checkpoint stores in the store queue; (4) clear the commit pointer and the merge pointer; and (5) resume executing instructions from the restored checkpoint. When resuming executing instructions from the restored checkpoint, the processor is configured to perform limited or no merging of stores into existing entries in the store queue.

In some embodiments, the processor is configured to generate an additional checkpoint while at least one prior checkpoint is active. When generating the additional checkpoint, the processor is configured to update the merge pointer to indicate an entry in the store queue that contains a youngest store at a time that the additional checkpoint is generated. The processor is configured to then freely merge subsequent stores to the same cache line into entries younger than the entry indicated by the merge pointer.

In some embodiments, upon detecting an error condition while two or more checkpoints are set, the processor is configured to halt executing instructions. If the error condition is associated with an instruction after a first checkpoint and before a last checkpoint, the processor is configured to use the first checkpoint to restore an associated state. Otherwise, if the error condition is associated with an instruction after the last checkpoint, the processor is configured to use the last checkpoint to restore an associated state. The processor is configured to then: (1) clear the commit pointer and the merge pointer and (2) resume executing instructions from the restored checkpoint. When resuming executing instructions, the processor is configured to perform limited or no merging of stores to existing entries in the store queue.

In some embodiments, when restoring the pre-checkpoint state, if the first checkpoint is restored, the processor is configured to use the commit pointer to identify stores placed in the store queue since the first checkpoint. Otherwise, the processor is configured to use the merge pointer to identify stores placed in the store queue since the last checkpoint. The processor is configured to then invalidate the identified stores.

In some embodiments, the predetermined condition includes at least one of: (1) a checkpoint instruction; (2) a predetermined number of entries in the store queue having been used; (3) a predetermined pattern of executing instructions; or (4) a condition in the processor which indicates that freely merging stores into existing entries in the store queue can result in improved performance while executing instructions.

In some embodiments, when merging stores into an existing entry in the store queue, the processor is configured to overwrite one or more bytes of an existing entry in the store queue with data from a new store that is directed to the same cache line as the store contained in the existing entry.

In some embodiments, when performing the limited merging of stores, the processor is configured to merge stores into a predetermined subset of the entries in the store queue.

Figure 1A:
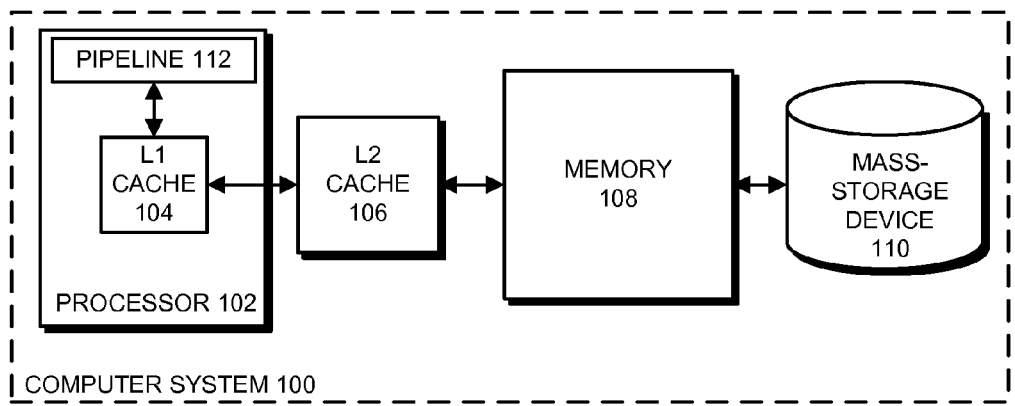
FIG. 1A presents a block diagram of a computer system in accordance with embodiments of the present invention.

For a better understanding of the aforementioned embodiments of the present invention as well as additional embodiments thereof, reference should be made to the detailed description of these embodiments below, in conjunction with the figures, in which like reference numerals refer to corresponding parts throughout.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Terminology

The following description includes the terms "strand" and "thread." Although these terms are known in the art, the following definitions are provided to clarify the subsequent description.

The term "thread" refers to a "thread of execution," which is a software entity that can be run on hardware. For example, a computer program can be executed using one or more software threads.

A strand includes state information that is stored in hardware that is used to execute a thread. More specifically, a strand includes the software-visible architectural state of a thread, along with any other microarchitectural state required for the thread's execution. For example, a strand can include a program counter (PC), a next program counter (NPC), and one or more general-purpose registers, floating-point registers, condition-code registers, status registers, or ancillary state registers (ASRs).

Computer System

FIG. 1A presents a block diagram of a computer system 100 in accordance with embodiments of the present invention. Computer system 100 includes processor 102, L2 cache 106, memory 108, and mass-storage device 110. Processor 102 includes L1 cache 104 and pipeline 112.

Processor 102 can be a general-purpose processor that performs computational operations. For example, processor 102 can be a central processing unit (CPU), such as a microprocessor. Note that processor 102 can also be a controller or an application-specific integrated circuit.

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile storage device, such as a disk drive or a large flash memory, with a large access time, while L1 cache 104, L2 cache 106, and memory 108 are smaller, faster semiconductor memories that store copies of frequently used data. Memory 108 can be a dynamic random access memory (DRAM) structure that is larger than L1 cache 104 and L2 cache 106, whereas L1 cache 104 and L2 cache 106 are typically comprised of smaller static random access memories (SRAM). In some embodiments of the present invention, L2 cache 106, memory 108, and mass-storage device 110 are shared between one or more processors in computer system 100. Such memory structures are well-known in the art and are therefore not described in more detail.

Computer system 100 can be incorporated into many different types of electronic devices. For example, computer system 100 can be part of a desktop computer, a laptop computer, a server, a media player, an appliance, a cellular phone, a piece of testing equipment, a network appliance, a calculator, a personal digital assistant (PDA), a hybrid device (e.g., a "smart phone"), a guidance system, a control system (e.g., an automotive control system), or another electronic device.

Although we use specific components to describe computer system 100, in alternative embodiments different components can be present in computer system 100. For example, computer system 100 can include video cards, network cards, optical drives, and/or other peripheral devices that are coupled to processor 102 using a bus, a network, or another suitable communication channel. Alternatively, computer system 100 may include one or more additional processors, wherein the processors share some or all of L2 cache 106, memory 108, and mass-storage device 110.

Figure 1B:
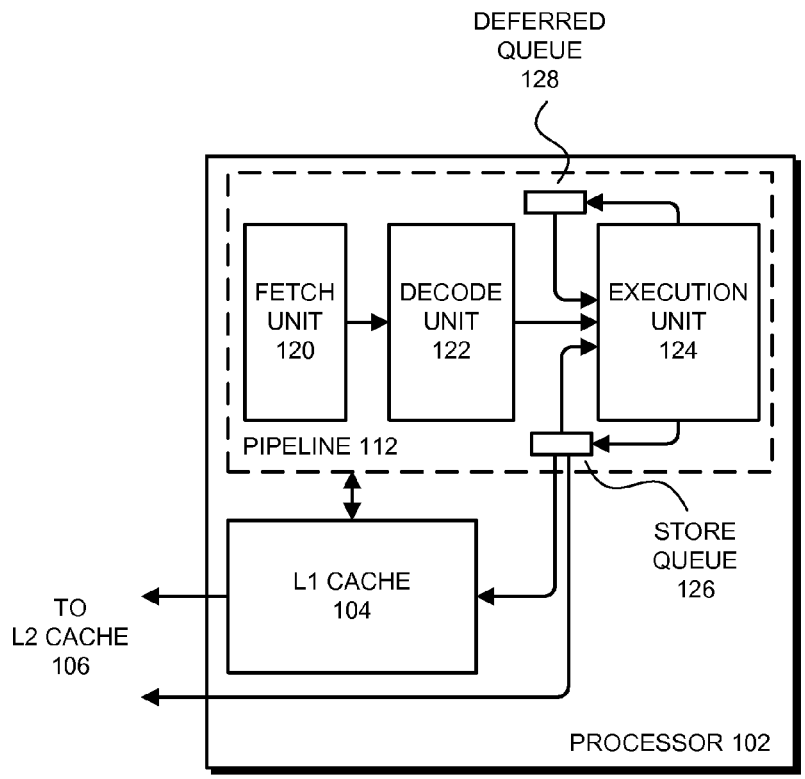
FIG. 1B presents a block diagram of a processor in accordance with embodiments of the present invention.

FIG. 1B presents a block diagram of processor 102 in accordance with embodiments of the present invention. As shown in FIG. 1B, pipeline 112 includes fetch unit 120, decode unit 122, and execution unit 124. Pipeline 112 is used to execute instructions from program code.

Within pipeline 112, fetch unit 120 fetches instructions from L1 cache 104 (or from higher levels of the memory hierarchy) for execution in processor 102. Decode unit 122 decodes the fetched instructions and prepares the instructions for execution in execution unit 124. Execution unit 124 executes instructions forwarded from decode unit 122. Execution unit 124 can include one or more floating point execution units, integer execution units, branch execution units, and/or memory execution units (e.g., load-store units).

In embodiments of the present invention, pipeline 112 includes deferred queue 128, which is used to store deferred instructions with unresolved data dependencies until the unresolved data dependencies are resolved. When the unresolved data dependencies are eventually resolved, processor 102 executes the deferred instructions. While the instructions with unresolved data dependencies are held in the deferred queue, processor 102 can speculatively execute subsequent non-dependent instructions. Speculative execution is described in more detail below.

In embodiments of the present invention, pipeline 112 includes store queue 126, which is an N-entry first-in-first-out (FIFO) queue used by processor 102 to buffer stores. Generally, a store is executed by processor 102 and then buffered in store queue 126, making it appear to processor 102 that the store has been completed. However, the store may be held in store queue 126 until other accesses to the next level of the memory hierarchy have finished.

When a given store is buffered in store queue 126, the data from the buffered store can be "forwarded" to subsequent load instructions. When forwarding data, processor 102 copies the data from an entry in store queue 126 to a register for subsequent use by execution unit 124.

In addition, subsequent stores can be merged with already-buffered stores in store queue 126 by coalescing subsequently buffered stores into existing entries that contain stores to the same address. In other words, merging stores into an existing entry in the store queue involves writing or overwriting one or more bytes of an existing entry in the store queue with data from a new store. For example, because processor 102 supports stores ranging in size from a single byte to a double-word, merging stores can involve coalescing single bytes into an entry in the store queue that already contains one or more bytes of a buffered store. Store merging is described in more detail below.

Note that pipeline 112 is an exemplary pipeline which is provided for the purposes of illustration. In alternative embodiments, pipeline 112 contains other types of stages (units) and/or circuits. The other types of stages and/or circuits that can be used in a pipeline are known in the art and hence are not described in more detail.

Figure 1C:
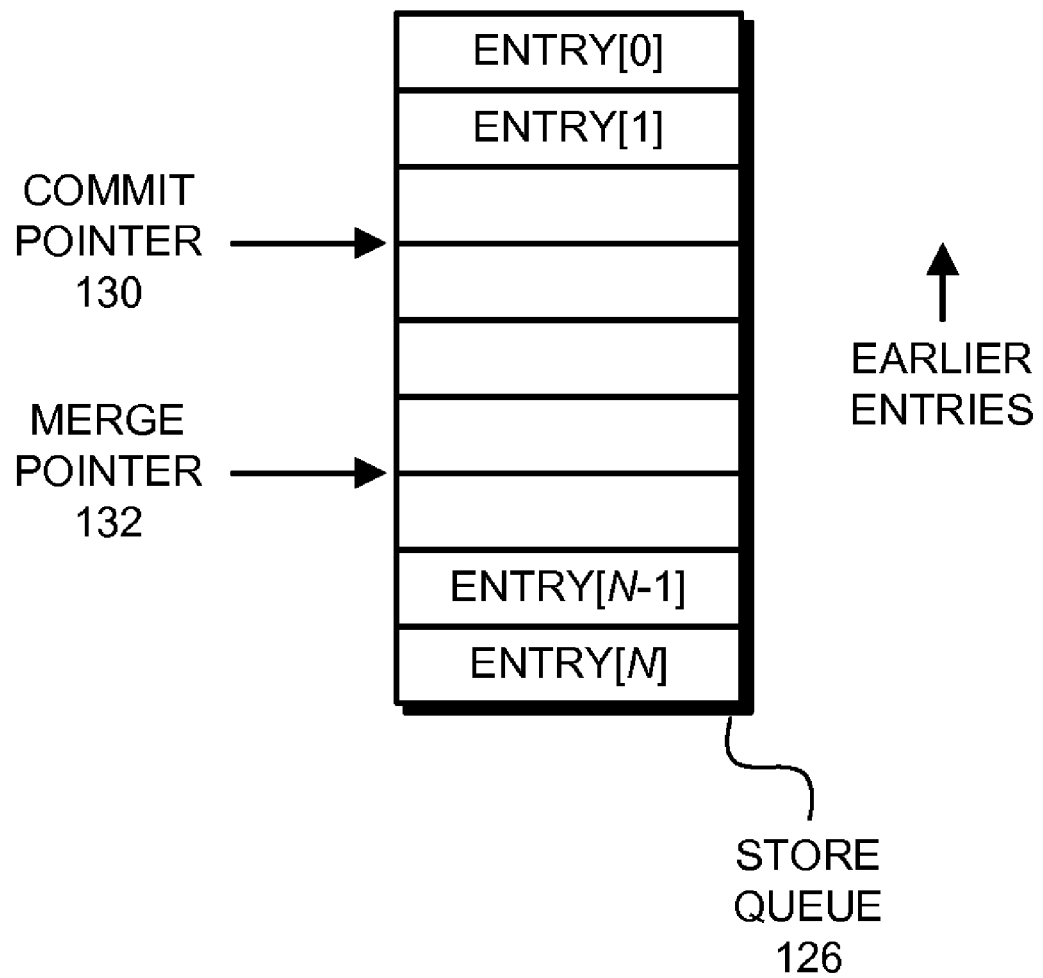
FIG. 1C presents a block diagram illustrating a store queue in accordance with embodiments of the present invention.

FIG. 1C presents a block diagram illustrating a store queue 126 in accordance with embodiments of the present invention. Store queue 126 includes N entries, commit pointer 130, and merge pointer 132. In embodiments of the present invention, store queue 126 includes a sufficient number (N) of entries to enable efficient store buffering while limiting the size of the lookup structure associated with store queue 126. For example, in some embodiments, store queue 126 can include 16 entries. Note that because embodiments of the present invention enable aggressive store merging, these embodiments require fewer entries in the store queue than would be required in a prior art system for equivalent store queue performance.

Commit pointer 130 is a pointer that indicates which entries in store queue 126 can be committed to the architectural state of processor 102 (and/or computer system 100). In some embodiments, commit pointer is initially set to null or to another predetermined value (e.g., the last entry in store queue 126, entry[N]), which indicates that all stores in store queue 126 can be committed. Next, when a checkpoint is generated, processor 102 sets commit pointer 130 to indicate which entries can be committed and which entries should be retained so that the pre-checkpoint state of processor 102 can be recovered in the event of an error (checkpointing is described in more detail below). For example, assuming that commit pointer 130 is set as shown in FIG. 1C, the pre-checkpoint entries above commit pointer 130 in store queue 126 can be committed by processor 102, but any subsequent buffered stores below commit pointer 130 must be retained until a commit is encountered.

In some embodiments of the present invention, commit pointer 130 can be adjusted to indicate a later entry in store queue 126 if one or more of the subsequent stores buffered in store queue 126 become safe to be committed to the architectural state of processor 102. In some embodiments, commit pointer 130 is adjusted when multiple checkpoints have been generated and the results from the earliest checkpoint are committed (i.e., when the earliest checkpoint is successfully cleared). On the other hand, when a single checkpoint is successfully cleared, commit pointer 130 can be reset to null or to another predetermined value (e.g., the last entry in store queue 126, entry[N]), to indicate that all the stores in store queue 126 can be committed.

In embodiments of the present invention, merge pointer 132 indicates the entries in store queue 126 for which stores can be freely ("aggressively") merged. Like commit pointer 130, merge pointer 132 is initially set to null or to another predetermined value (e.g., the last entry in store queue 126, entry[N]). During operation, when a checkpoint is generated, merge pointer 132 can be set to indicate the same entry as commit pointer 130. Processor 102 can then freely merge subsequent stores below merge pointer 132 (i.e., processor 102 can coalesce any number of stores to the same cache line into a given entry).

In some embodiments of the present invention, when a subsequent checkpoint is generated while a prior checkpoint is active, merge pointer 132 can be updated to indicate the last entry before the subsequent checkpoint was generated. (Generating multiple checkpoints is described in more detail below.) As with the initial checkpoint, processor 102 can then freely merge subsequent stores below merge pointer 132. By setting merge pointer 132 in this way, a record is kept of which stores are associated with the last checkpoint, which enables aggressive store merging for these entries, but also facilitates recovering from earlier checkpoints and/or the last checkpoint in the event of an error.

When all prior checkpoints are successfully cleared, commit pointer 130 can be reset to point to the same entry as merge pointer 132, which indicates that all the stores in store queue 126 before merge pointer 132 can be committed. When all checkpoints are cleared, both merge pointer 132 and commit pointer 130 can be cleared. In some embodiments, clearing the checkpoints involves resetting them to null. In alternative embodiments, clearing the checkpoints involves setting both pointers to a predetermined value (e.g., the last entry in store queue 126, entry[N]), to indicate that all the stores in store queue 126 can be committed.

Some embodiments of the present invention include two or more merge pointers 132. For example, some embodiments include a merge pointer 132 associated with a checkpoint. In these embodiments, the merge pointers 132 individually function in a similar way to the above-described embodiments.

Speculative Execution

Embodiments of the present invention support speculative execution. Generally, these embodiments start by executing instructions in program order in a normal-execution mode. Then, when processor 102 (see FIG. 1) encounters a stall condition, these embodiments can enter a speculative execution mode to continue to perform useful computational work until the stall condition is resolved. For example, some embodiments of the present invention support a speculative execution mode which is referred to as execute-ahead mode, wherein instructions with unresolved data dependencies are deferred, while other non-dependent instructions are executed in program order.

During execute-ahead mode, processor 102 defers an instruction with an unresolved data dependency by placing the instruction into a deferred queue 128, then executes subsequent non-dependent instructions. While executing the subsequent instructions, processor 102 can defer instructions with unresolved data dependencies by placing these instructions into deferred queue 128 in program order. When data ultimately returns for a deferred instruction, processor 102 can make one or more passes through deferred queue 128 to execute deferred instructions that depend on the returned data. While executing these instructions, processor 102 can re-defer instructions with unresolved data dependencies by placing these instructions back into deferred queue 128 in program order. If all the deferred instructions in deferred queue 128 are executed (i.e., when deferred queue 128 is empty), processor 102 can resume execution in normal-execution mode. Otherwise, processor 102 can resume execution in execute-ahead mode until a subsequent data return.

In some embodiments of the present invention, processor 102 defers stores that cannot be merged into store queue 126. When deferring a store, processor 102 places the store in deferred queue 128, where the store stays until store queue 126 has committed sufficient stores to permit the deferred store to re-execute.

Checkpointing

Embodiments of the present invention support checkpointing, which involves preserving the precise architectural state of one or more threads to enable recovery of the threads to the checkpointed state in the event that an error condition is detected.

Generally, when generating a checkpoint, processor 102 performs one or more operations to preserve the architectural state of processor 102 at the time of the checkpoint. For example, processor 102 can save the underlying strand's PC, NPC, general-purpose registers, floating-point registers, condition-code registers, status registers, ASRs, and/or other architectural state for recovering the pre-checkpoint state. In addition, processor 102 can "gate" the store queue to allow pre-checkpoint stores to commit, while preventing stores following the checkpoint from committing until a commit is encountered (as described in more detail below).

Some embodiments of the present invention support multiple checkpoints. In these embodiments, one or more additional checkpoints can be generated following an initial checkpoint. The subsequent checkpoints preserve the architectural state of processor 102 at the time of the checkpoint in the same way as the initial checkpoint. In these embodiments, processor 102 includes mechanisms for distinguishing the checkpoints. For example, the store queue may include mechanisms for indicating that stores are associated with a particular checkpoint.

Checkpoint-Commit Regions

In the following sections, we describe the operations performed by embodiments of the present invention that use checkpointing to enable aggressive store merging in store queue 126. For the purposes of illustration, we refer to regions of program code executed following a checkpoint and preceding a commit as "checkpoint-commit regions." Generally, checkpoint-commit regions start at a checkpoint and end at the commitment of post-checkpoint results (or upon restoration of the pre-checkpoint state in the event of an error).

More specifically, before executing code in a checkpoint-commit region, processor 102 checkpoints the architectural state of the thread. Processor 102 then executes the program code in the checkpoint-commit region. While executing the program code in the checkpoint-commit region, processor 102 freely merges post-checkpoint stores to the same cache line address within store queue 126. In other words, while executing instructions in the checkpoint-commit region, processor 102 can coalesce any number of stores to the same cache line into the same post-checkpoint entry in store queue 126. (Note that aggressive merging only applies to post-checkpoint entries. Pre-checkpoint entries are guaranteed to be ready to be committed and hence cannot have subsequent stores merged into them.)

If a trap, a memory-model violation (e.g., a total store order (TSO) violation), or other condition which could invalidate one or more entries in store queue 126 occurs while processor 102 is executing instructions in the checkpoint-commit region, processor 102 deletes the buffered stores from the checkpoint-commit region (i.e., clears and/or invalidates the associated entries in store queue 126) and uses the checkpoint to recover to the pre-checkpoint state.

Otherwise, processor 102 eventually commits the results at the end of the checkpoint-commit region. During the commit, processor 102 discards the checkpoint and joins the results from the checkpoint-commit region by removing the gate from the store queue (thereby allowing the results from the checkpoint-commit region to be committed).

In some embodiments of the present invention, the commit is caused by a commit instruction in the program code. In alternative embodiments, the commit is initiated by processor 102 upon determining that the results after the checkpoint can be committed, (i.e., upon determining that no trap condition, memory-model violation, etc. can occur for the last store instruction to be merged into a given entry (or entries)).

Note that a checkpoint-commit region need not be a predetermined section of the program code. For example, (as described with respect to FIG. 2) processor 102 can determine both when to generate a checkpoint and when to commit the results following the checkpoint without encountering an instruction in the program code.

By checkpointing the architectural state of processor 102 before executing the program code in the checkpoint-commit region, these embodiments enable "aggressive" store merging. In other words, because the checkpoint can be used to recover processor 102 (i.e., the thread) to a pre-checkpoint state, processor 102 can merge any number of stores into the same entry in store queue 126. Thus, unlike the prior art, which has to account for potential traps, memory model violations, or other store-invalidating conditions by limiting the number of stores that can be merged, embodiments of the present invention can make more efficient use of the entries available in store queue 126.

Using the Store Queue

Figure 2:
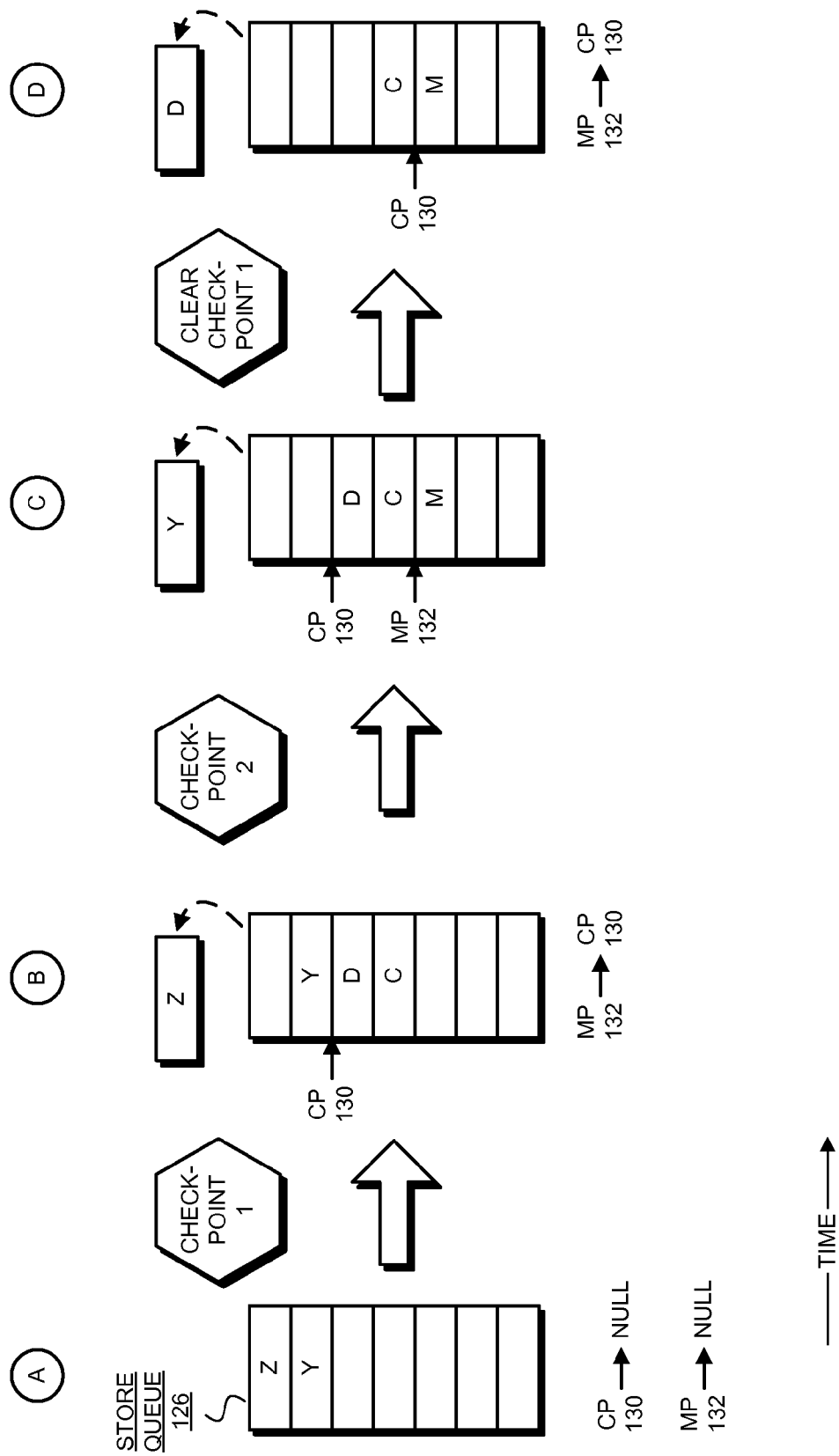
FIG. 2 presents a block diagram illustrating the use of a store queue, a commit pointer, and a merge pointer in accordance with embodiments of the present invention.

FIG. 2 presents a block diagram illustrating the use of store queue 126, commit pointer 130 (CP 130), and merge pointer 132 (MP 132) in accordance with embodiments of the present invention. More specifically, FIG. 2 illustrates the state of store queue 126 and the pointers at a sequence of different times (A), (B), (C), and (D), wherein time increases from left to right.

As shown at (A) in FIG. 2, store queue 126 initially contains two stores "Y" and "Z" (where Y is the younger of the two stores) and no checkpoints have been generated. Because no checkpoints have been generated, CP and MP are both pointed at null. Hence, processor 102 is permitted to complete any stores in store queue 126 normally (i.e., processor 102 can freely commit any store in store queue 126 to the architectural state of computer system 100).

In embodiments of the present invention, before a checkpoint is generated, no stores can be merged aggressively. In these embodiments, stores can be merged before a checkpoint is generated, but in only a limited way. For example, in some embodiments, stores are merged for only the most recently buffered entry in the store queue before a checkpoint is generated. In these embodiments, CP and MP can be pointed at the most recent entry in store queue 126 to enable limited pre-checkpoint store merging in store queue 126 (i.e., for one entry). If stores are merged aggressively without the checkpoint, a trap or other error condition could cause an unrecoverable error.

Before stores Y and Z have been completed, processor 102 generates a checkpoint ("checkpoint 1") to enable aggressive store merging. In embodiments of the present invention, processor 102 can generate a checkpoint to enable aggressive store merging at any time when processor 102 determines that aggressive store merging can enable increased performance. For example, processor 102 can generate a checkpoint (and begin aggressive store merging) when a predetermined number of entries in the store queue have been used, when a checkpoint instruction is encountered, when a pattern in the program code indicates that aggressive store merging will increase performance, or for another reason.

In some embodiments of the present invention, processor 102 analyzes the program code at runtime to determine when to automatically generate checkpoints. In some embodiments of the present invention, a compiler analyzes program code during compilation and inserts explicit checkpoint instructions into the program code to cause processor 102 to generate checkpoints at specified times during execution of the program code (e.g., before a section of the program code that includes multiple stores).

Because processor 102 buffered stores Y and Z before the checkpoint was generated, these stores can be completed to the next level of memory hierarchy following the generation of the checkpoint (i.e., as processor 102 executes program code in the checkpoint-commit region). Stores buffered after the checkpoint was generated, however, must be retained in store queue 126 until the checkpoint is cleared and the stores can be committed (or until an error condition is encountered and the buffered stores are deleted). Thus, processor 102 updates commit pointer 130 to indicate the location in store queue 126 where the last store was buffered before the checkpoint was generated. As can be seen at (B) in FIG. 2, CP 130 indicates that store Y can be committed, while post-checkpoint stores "C" and "D" must be retained. In addition, processor 102 updates merge pointer 132 to indicate that all stores following the entry indicated by CP 130 are candidates for aggressive store merging. For example, stores D and C are both candidates for aggressive store merging.

Although preventing subsequent stores from committing, CP 130 allows pre-checkpoint stores to commit. For example, as shown at (B) in FIG. 2, store Z is committed after checkpoint 1 is generated. Note that stores such as Y and Z can be committed because they are not required for recovering the pre-checkpoint state.

Processor 102 then generates checkpoint 2 while checkpoint 1 is still active. As before, processor 102 can generate checkpoint 2 for a number of reasons (e.g., a checkpoint instruction, a predefined condition, etc.).

Processor 102 then adjusts MP 132 to indicate that stores should only be merged to entries in store queue 126 below the last store that was buffered (or merged) during the first checkpoint-commit region. For example, at (C) in FIG. 2, MP 132 indicates that all the entries from store "M" down in store queue 126 can be used for aggressive store merging, whereas stores C and D cannot. MP 132 is set in this way to preserve the results from the earlier checkpoint region, thereby making recovery of both the initial checkpoint (using CP 130) or the subsequent checkpoint (using MP 132) possible.

As can be seen in FIG. 2, during each checkpoint-commit region (i.e., following each checkpoint), stores that are directed at the same cache line can be buffered to different entries in the store queue. For example, at (B) in FIG. 2, stores Y and D may be directed to the same cache line, but are unable to be merged (i.e., placed in one entry) because of the checkpoint-commit region boundary denoted by CP 130.

Processor 102 then clears checkpoint 1. In some embodiments of the present invention, processor 102 can clear a checkpoint (and end aggressive store merging for the corresponding checkpoint-commit region) when each buffered store from the checkpoint-commit region can be committed to the architectural state. In some embodiments, processor 102 clears the checkpoint when the stores can be committed and: (1) a predetermined number of entries in the store queue are clear; (2) a commit instruction is encountered; (3) a pattern in the program code indicates that aggressive store merging will not increase performance (e.g., no results are being written to store queue 126); or (4) for another reason. (Note that the checkpoint can also be cleared if the pre-checkpoint state is recovered in the event of an error, which is not shown in FIG. 2.)

Because checkpoint 1 has been cleared, stores D and C can be committed. Processor 102 therefore updates commit pointer 130 to indicate the location in store queue 126 where the last store was buffered before checkpoint 2 was generated, which corresponds to the location indicated by MP 132 (processor 102 leaves MP 132 pointing at the same location).

As shown at (D) in FIG. 2, store D is committed after checkpoint 1 is cleared. Stores C and D can be committed because they are no longer required for recovering the pre-checkpoint state associated with (cleared) checkpoint 1.

Although not shown in FIG. 2, processor 102 can then continue to execute instructions, setting checkpoints and updating the pointers to indicate which stores can be committed and which are candidates for aggressive store merging. If (and when) all checkpoints have been cleared, processor 102 resets CP 130 and MP 132 to null or to another predetermined value (e.g., the last entry in store queue 126, entry[N]), to indicate that all the stores in store queue 126 can be committed and that no stores are allowed to be aggressively merged into any entries in store queue 126.

Store Merging

Figure 3:
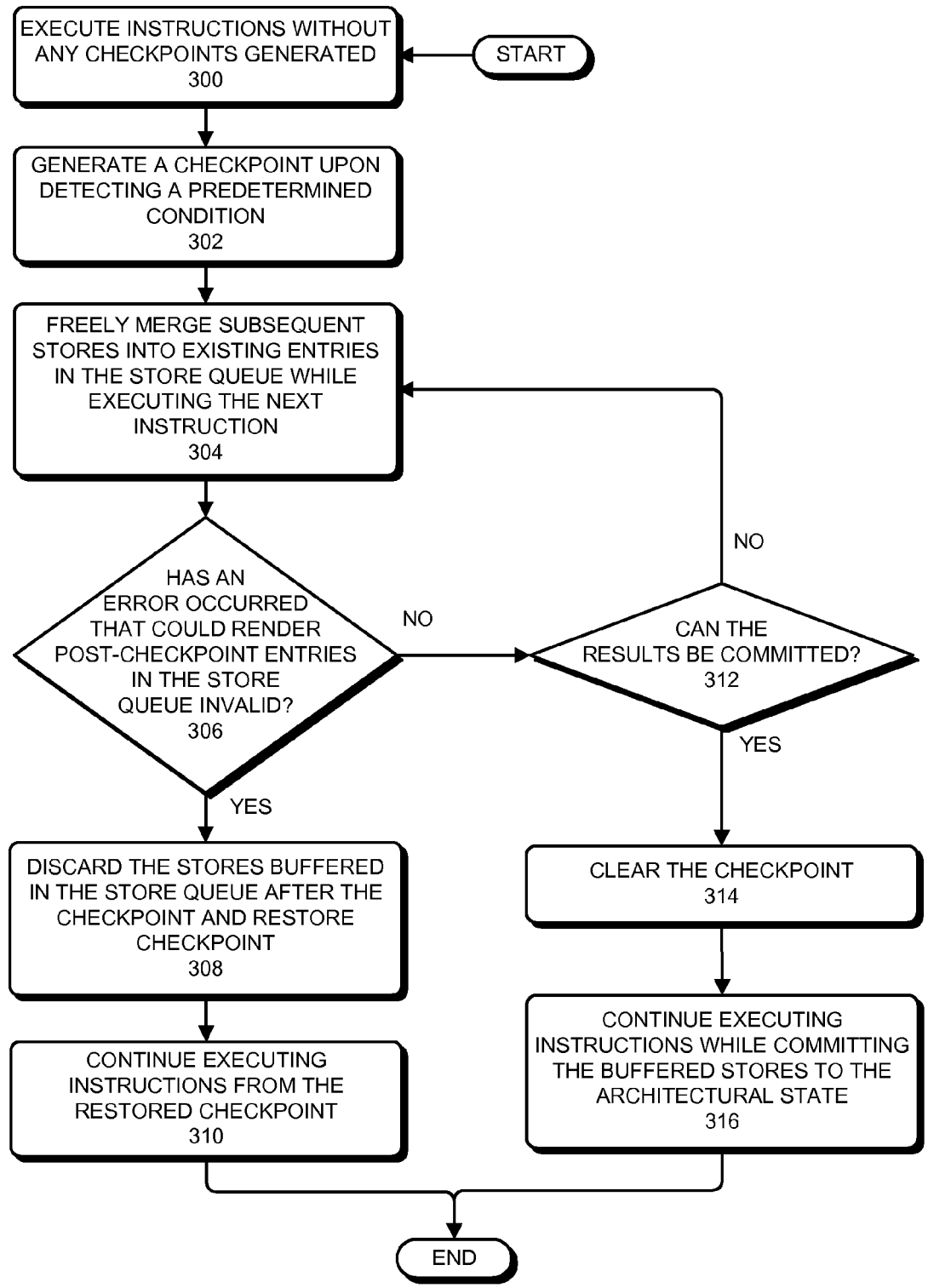
FIG. 3 presents a flowchart illustrating the process of merging stores in accordance with embodiments of the present invention.

FIG. 3 presents a flowchart illustrating the process of merging stores in embodiments of the present invention. For brevity and clarity, the following example does not describe setting CP 130 or MP 132. However, these pointers can be used as described with respect to FIG. 2 to indicate the entries in store queue 126 that are candidates for aggressive store merging.

The process starts with processor 102 executing instructions without any checkpoints generated (step 300). Because no checkpoints have been generated, processor 102 cannot recover to the pre-checkpoint state and therefore cannot aggressively merge stores (due to the risk of an unrecoverable error when aggressively merging stores). Hence, in some embodiments of the present invention, processor 102 performs limited store merging when no checkpoints have been generated. In alternative embodiments, processor 102 performs no store merging when no checkpoints have been generated, but instead defers stores which are directed to cache lines that correspond to existing entries in store queue 126.

Processor 102 then generates a checkpoint upon detecting a predetermined condition (step 302). Generally, processor 102 generates the checkpoint when aggressive store merging can facilitate improved performance. For example, processor 102 can generate a checkpoint when a predetermined number of entries in the store queue have been used, when a checkpoint instruction is encountered, when a pattern in the program code indicates that aggressive store merging will increase performance, or for another reason.

Following the generation of the checkpoint, processor 102 begins freely ("aggressively") merging subsequent stores into existing entries in the store queue to the same cache line while executing the next instruction (step 304). While freely merging stores into existing entries, processor 102 merges all stores that are directed at a given cache line into the same entry in store queue 126. Because stores can be merged freely following the generation of a checkpoint, these entries in store queue 126 can be used more effectively than in existing systems. In other words, because these embodiments are not limited (by potential trap conditions or other error cases) by the number of stores that can be merged into a given entry, the other entries can be available for buffering subsequent stores to different cache lines.

While executing instructions following the checkpoint, processor 102 determines if an error has occurred that could render one or more post-checkpoint entries in the store queue invalid (step 306). For example, processor 102 can determine if a memory model violation has occurred, a trap has occurred for an instruction that occurs before a buffered store in the program code, or if another type of error has occurred. If so, processor 102 discards the results of instructions executed after the checkpoint and restores the checkpoint (step 308). Processor 102 then continues execution from the restored checkpoint (step 310). In some embodiments of the present invention, when discarding the results, processor 102 invalidates and/or clears the results from store queue 126.

Otherwise, processor 102 determines if the results can be committed (step 312). In some embodiments of the present invention, the results can be committed when each buffered store from the checkpoint-commit region can be committed to the architectural state. If the results cannot be committed, processor 102 returns to step 304 to continue to execute subsequent instructions while freely merging stores into existing entries in store queue 126. Otherwise, processor 102 clears the checkpoint (step 314). Processor 102 then continues executing instructions while committing the buffered stores to the architectural state of computer system 100 (as resources become available) (step 316).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for merging stores in an N-entry first-in-first-out (FIFO) store queue in a processor, comprising:
   executing instructions before a checkpoint is generated, wherein executing instructions before the checkpoint is generated involves performing limited or no merging of stores into existing entries in the store queue;
   upon detecting a predetermined condition, generating the checkpoint, wherein generating the checkpoint involves saving an architectural state of the processor; and
   executing instructions after the checkpoint is generated, wherein executing instructions after the checkpoint is generated involves freely merging subsequent stores into post-checkpoint entries in the store queue.

2. The method of claim 1, wherein generating the checkpoint involves:
   setting a commit pointer and a merge pointer to indicate an entry in the store queue that contains a youngest store;
   wherein stores in entries equal to or older than the entry indicated by the commit pointer can be committed to an architectural state of the processor, but subsequent post-checkpoint stores buffered to entries younger than the entry indicated by the commit pointer are held in the store queue and prevented from committing until the checkpoint is cleared; and
   wherein subsequent post-checkpoint stores can be freely merged into entries younger than the entry indicated by the merge pointer.

3. The method of claim 2, wherein while executing instructions after the checkpoint is generated, the method further comprises:
   upon detecting that all post-checkpoint stores can be committed to the architectural state of the processor,
   clearing the checkpoint;
   clearing the commit pointer and the merge pointer;
   releasing the post-checkpoint stores in the store queue to be committed to the architectural state of the processor; and
   continuing executing instructions, wherein executing instructions after the checkpoint is cleared involves performing limited or no merging of stores into existing entries in the store queue.

4. The method of claim 2, wherein while executing instructions after the checkpoint is generated, the method further comprises:
   upon detecting that an error that invalidates any of the post-checkpoint stores has occurred,
   halting executing instructions;
   using the checkpoint to restore an associated state;
   invalidating the post-checkpoint stores in the store queue and clearing the commit pointer and the merge pointer; and
   resuming executing instructions from the restored checkpoint, wherein executing instructions involves performing limited or no merging of stores into existing entries in the store queue.

5. The method of claim 2, wherein the method further comprises:
   generating an additional checkpoint while at least one prior checkpoint is active;
   wherein generating the additional checkpoint involves updating the merge pointer to indicate an entry in the store queue that contains a youngest store at a time that the additional checkpoint is generated; and
   wherein subsequent stores to the same cache line can be freely merged into entries younger than the entry indicated by the merge pointer.

6. The method of claim 5, wherein the method further comprises:
   detecting an error condition while two or more checkpoints are set;
   halting executing instructions;
   if the error condition is associated with an instruction after a first checkpoint and before a last checkpoint, using the first checkpoint to restore an associated state; and
   otherwise, if the error condition is associated with an instruction after the last checkpoint, using the last checkpoint to restore an associated state;
   clearing the commit pointer and the merge pointer; and
   resuming executing instructions from the restored checkpoint, wherein resuming executing instructions involves performing limited or no merging of stores to existing entries in the store queue.

7. The method of claim 6, wherein restoring the pre-checkpoint state involves:
   if the first checkpoint is restored, using the commit pointer to identify stores placed in the store queue since the first checkpoint;
   otherwise, using the merge pointer to identify stores placed in the store queue since the last checkpoint; and
   invalidating the identified stores.

8. The method of claim 1, wherein the predetermined condition includes at least one of:
a checkpoint instruction;
a predetermined number of entries in the store queue having been used;
a predetermined pattern of executing instructions; or
a condition in the processor which indicates that freely merging stores into existing entries in the store queue can result in improved performance while executing instructions.

9. The method of claim 1, wherein merging stores into an existing entry in the store queue involves overwriting one or more bytes of an existing entry in the store queue with data from a new store that is directed to the same cache line as the store contained in the existing entry.

10. The method of claim 9, wherein performing the limited merging of stores involves merging stores into a predetermined subset of the entries in the store queue.

11. An apparatus for merging stores in a processor, comprising:
an N-entry first-in-first-out (FIFO) store queue in the processor;
wherein the processor is configured to execute instructions before a checkpoint is generated, wherein when executing instructions before the checkpoint is generated, the processor is configured to perform limited or no merging of stores into existing entries in the store queue;
upon detecting a predetermined condition, the processor is configured to generate the checkpoint, wherein generating the checkpoint involves saving an architectural state of the processor; and
after the checkpoint is generated the processor is configured to execute instructions, wherein when executing instructions after the checkpoint is generated the processor is configured to freely merge subsequent stores into post-checkpoint entries in the store queue.

12. The apparatus of claim 11, wherein when generating the checkpoint, the processor is configured to set a commit pointer and a merge pointer to indicate an entry in the store queue that contains a youngest store;
wherein the processor is configured to commit stores in entries equal to or older than the entry indicated by the commit pointer to an architectural state of the processor, but to hold subsequent post-checkpoint stores buffered to entries younger than the entry indicated by the commit pointer in the store queue and prevent these stores from committing until the checkpoint is cleared; and
wherein the processor is further configured to freely merge subsequent post-checkpoint stores into entries younger than the entry indicated by the merge pointer.

13. The apparatus of claim 12, wherein while executing instructions after the checkpoint is generated, upon detecting that all post-checkpoint stores can be committed to the architectural state of the processor, the processor is configured to:
clear the checkpoint;
clear the commit pointer and the merge pointer;
release the post-checkpoint stores in the store queue to be committed to the architectural state of the processor; and
continue executing instructions, wherein executing instructions after the checkpoint is cleared involves performing limited or no merging of stores into existing entries in the store queue.

14. The apparatus of claim 12, wherein while executing instructions after the checkpoint is generated, upon detecting that an error that invalidates any of the post-checkpoint stores has occurred, the processor is configured to:
halt executing instructions;
use the checkpoint to restore an associated state;
invalidate the post-checkpoint stores in the store queue and clear the commit pointer and the merge pointer; and
resume executing instructions from the restored checkpoint, wherein executing instructions involves performing limited or no merging of stores into existing entries in the store queue.

15. The apparatus of claim 12, wherein the processor is configured to generate an additional checkpoint while at least one prior checkpoint is active;
wherein when generating the additional checkpoint, the processor is configured to update the merge pointer to indicate an entry in the store queue that contains a youngest store at a time that the additional checkpoint is generated; and
wherein the processor is further configured to freely merge subsequent stores to the same cache line into entries younger than the entry indicated by the merge pointer.

16. The apparatus of claim 15, wherein the processor is configured to:
detect an error condition while two or more checkpoints are set;
halt executing instructions;
if the error condition is associated with an instruction after a first checkpoint and before a last checkpoint, use the first checkpoint to restore an associated state;
otherwise, if the error condition is associated with an instruction after the last checkpoint, use the last checkpoint to restore an associated state;
clear the commit pointer and the merge pointer; and
resume executing instructions from the restored checkpoint, wherein when resuming executing instructions the processor is configured to perform limited or no merging of stores to existing entries in the store queue.

17. The apparatus of claim 16, wherein when restoring the pre-checkpoint state, if the first checkpoint is restored, the processor is configured to use the commit pointer to identify stores placed in the store queue since the first checkpoint;
otherwise, the processor is configured to use the merge pointer to identify stores placed in the store queue since the last checkpoint; and
the processor is configured to then invalidate the identified stores.

18. The apparatus of claim 11, wherein the predetermined condition includes at least one of:
a checkpoint instruction;
a predetermined number of entries in the store queue having been used;
a predetermined pattern of executing instructions; or
a condition in the processor which indicates that freely merging stores into existing entries in the store queue can result in improved performance while executing instructions.

19. The apparatus of claim 11, wherein when merging stores into an existing entry in the store queue, the processor is configured to overwrite one or more bytes of an existing entry in the store queue with data from a new store that is directed to the same cache line as the store contained in the existing entry.

20. The apparatus of claim 19, wherein when performing the limited merging of stores, the processor is configured to merge stores into a predetermined subset of the entries in the store queue.

21. A computer system for merging stores in a processor, comprising:
- a computer-readable storage device coupled to the processor, wherein the computer-readable storage device stores data for the processor;
- an N-entry first-in-first-out (FIFO) store queue in the processor;
- wherein the processor is configured to execute instructions before a checkpoint is generated, wherein when executing instructions before the checkpoint is generated, the processor is configured to perform limited or no merging of stores into existing entries in the store queue;
- upon detecting a predetermined condition, the processor is configured to generate the checkpoint, wherein generating the checkpoint involves saving an architectural state of the processor; and
- after the checkpoint is generated the processor is configured to execute instructions, wherein when executing instructions after the checkpoint is generated the processor is configured to freely merge subsequent stores into post-checkpoint entries in the store queue.

* * * * *